United States Patent [19]

Mertens

[11] Patent Number: 4,882,460

[45] Date of Patent: Nov. 21, 1989

[54] HORN OPERATING MEANS FOR A MOTOR VEHICLE STEERING WHEEL HAVING TWO CONTACT PLATES SOLELY SEPARATED BY A FOAM SHEET AND CONTACTABLE AT SPACED POINTS WITH SUBSTANTIALLY UNIFORM PRESSURE

[75] Inventor: Theobald Mertens, Mainz, Fed. Rep. of Germany

[73] Assignee: General Motors Corporation, Detroit, Mich.

[21] Appl. No.: 167,280

[22] Filed: Mar. 10, 1988

[30] Foreign Application Priority Data

Apr. 6, 1987 [DE] Fed. Rep. of Germany ....... 3711822

[51] Int. Cl.⁴ ............................................... H01H 1/10
[52] U.S. Cl. .................................. 200/512; 200/85 R
[58] Field of Search ............... 200/159 B, 85 R, 85 A, 200/86 R, 86 A, DIG. 35, 61.55, 511, 512, 514, 515

[56] References Cited

U.S. PATENT DOCUMENTS

| | | | |
|---|---|---|---|
| 2,796,484 | 6/1957 | Wolf | 200/61.57 |
| 2,943,164 | 6/1960 | Kniffin, Jr. | 200/61.57 |
| 3,476,897 | 11/1969 | De Vincent | 200/61.57 |
| 3,485,974 | 12/1969 | Wolf et al. | 200/61.57 |
| 4,172,216 | 10/1979 | O'Shea | 200/511 |
| 4,228,115 | 10/1980 | Gardner et al. | 200/159 B X |
| 4,325,568 | 4/1982 | Clark et al. | 200/61.55 X |
| 4,388,509 | 6/1983 | Ullmann et al. | 200/157 |

FOREIGN PATENT DOCUMENTS 3503847 11/1986 Fed. Rep. of Germany .

*Primary Examiner*—Renee S. Luebke
*Attorney, Agent, or Firm*—R. L. Phillips

[57] ABSTRACT

A horn operating means has two contact plates separated from each other by a resilient foam sheet. For contacting, one of the contact plates is deformed by the operating force so much that it will touch the other contact plate. In one embodiment, grooves in the central region of one of the contact plates provide for the necessary operating forces not being greater in the central region than in the edge region.

2 Claims, 2 Drawing Sheets

Fig. 3
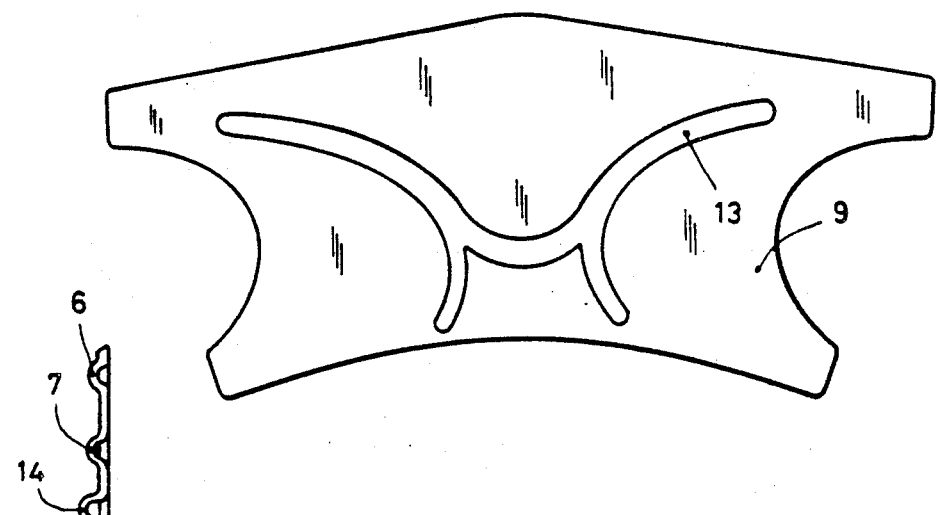
Fig. 4
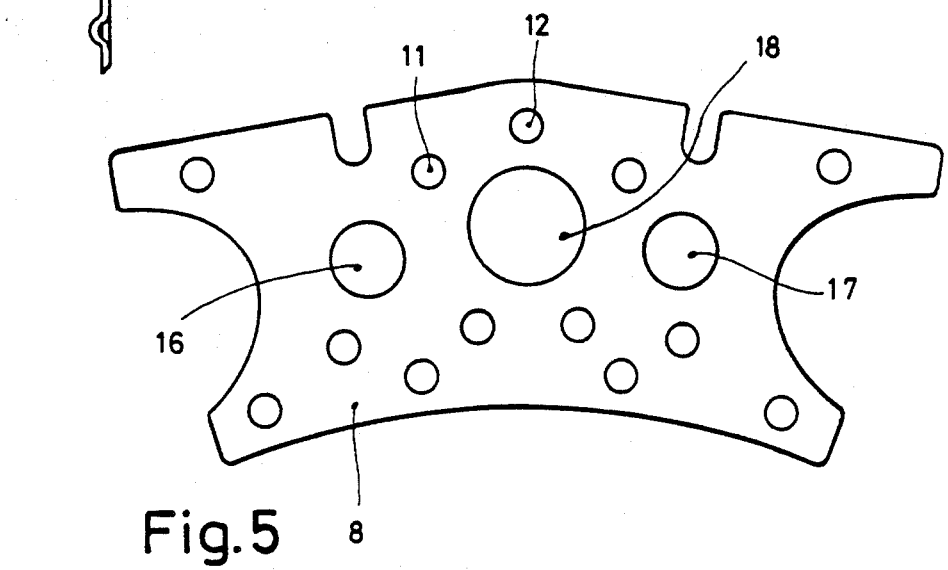
Fig. 5

HORN OPERATING MEANS FOR A MOTOR VEHICLE STEERING WHEEL HAVING TWO CONTACT PLATES SOLELY SEPARATED BY A FOAM SHEET AND CONTACTABLE AT SPACED POINTS WITH SUBSTANTIALLY UNIFORM PRESSURE

TECHNICAL FIELD

The present invention pertains to a horn operating means to be installed in the steering wheel of a motor vehicle, comprising two contact plates which are separated from each other by a resilient foam sheet and contact each other when pressure is applied to an operating surface. One contact plate normally has projections directed toward the other contact plate, and the latter contact plate is elastically deformable by the vehicle operator to effect the contact. Such horn operating means are commonly used in modern motor vehicles and are therefore generally known.

BACKGROUND OF THE INVENTION

In the prior art horn operating means, the necessary operating force is normally substantially greater in the central region than in the edge region because of the edge mounting of the parts. So that the operating forces are not too low in the edge region such as to allow inadvertent horn operation, the contact plates and foam sheet have been so stably supported as to require undesirably great operating forces in the central region of the horn operating mechanism.

SUMMARY OF THE INVENTION

The present invention offers improvement over horn operating means of the type described in the introduction in providing substantially uniform operating resistence over the entire horn operating region. This is accomplished according to the present invention in such a way that reduces the operating force required in the central region of the horn operating mechanism.

This design makes it possible to reduce the necessary operating forces in the central region to the same values as in the edge regions. The operating forces thus become uniform, which makes it possible to select, on the whole, substantially lower forces than in the prior art horn operating means.

The means for reducing the required operating forces in the central region can take several forms. An especially simple and efficient form is to provide tongue-like deflection portions in the central region of the contact plate located on the operating side of the horn operator mechanism.

Another way of reducing the resistance to deformation of the contact plate in the central region is obtained with a foam sheet having apertures in the central region to reduce its resistance to contact of the contact plates through the foam sheet apertures.

According to another embodiment of the present invention, the projections of one contact plate, which are turned toward the opposite contact plate, are at a shorter distance from the other contact plate in the central region than in the edge region. The greater resistance to deflection in the cental region can thus be counteracted, so that contacting can be achieved there with the same operation force as in the edge region.

The present invention permits numerous embodiments. To better illustrate the basic principle, three of these embodiments are shown in the drawing, and they will be described below.

DESCRIPTION OF DRAWINGS

FIG. 3 is a plan view of the contact plate 9 of the horn operating means in FIGS. 1 and 2 according to one embodiment of the present invention.

FIG. 4 is a section view of the contact plate 5 in FIGS. 1 and 2 according to another embodiment of the present invention.

FIG. 5 is a plan view of the foam sheet 8 in FIGS. 1 and 2 according to a third embodiment of the present invention.

DETAILED DESCRIPTION OF PREFERRED EMBODIMENTS

Figure 1:
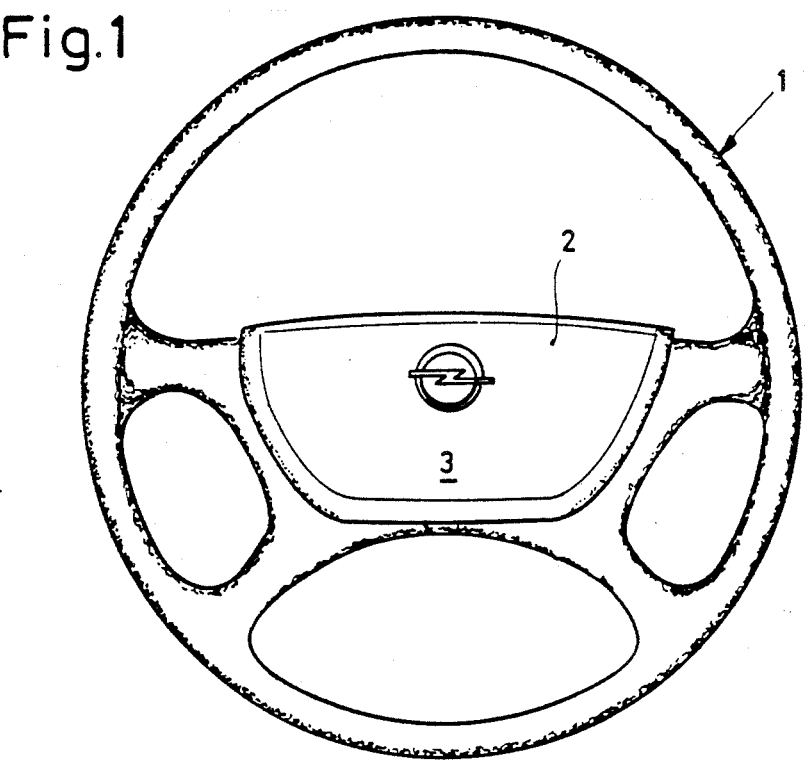
FIG. 1 is a frontal view of a steering wheel with the horn operating means according to the present invention.

FIG. 1 shows a steering wheel 1 on whose hub a horn operating means or mechanism 2 is disposed. This horn operating means 2 includes a pad 10 (see FIG. 2) whose entire surface turned toward the driver is designed as an operating surface 3, so that the horn can be operated by pressing any point of the surface.

Figure 2:
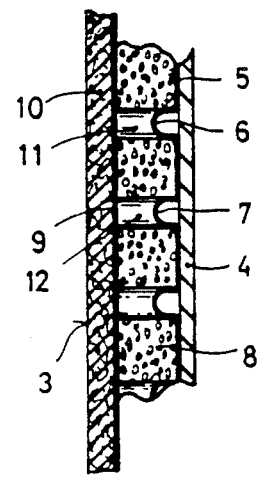
FIG. 2 is a section view of the horn operating means in FIG. 1.

FIG. 2 shows a sectional view of the the horn operating means. It is seen that a contact plate 5 made from a conductive material is disposed on a support plate 4, and the contact plate has projections 6, 7 in the form of knobs or nipples, which are directed toward another contact plate 9 which is parallel to the contact plate 5 and is solely separated from same by a resilient foam sheet 8, without the projections touching the contact plate 9. The pad 10, which forms the operating surface 3 previously mentioned, is placed on the contact plate 9. Openings 11, 12 provided at various locations in the foam sheet 8 permit the contact plate 9 to contact the projections 6, 7 when pressure is applied to the pad 10 at or in closed proximity. Thus, such contacting only takes place in the region in which the pad 10 is being pressed. In such an arrangement, deflection of an ordinary contact plate would require a greater force in the central region than bending in the edge region.

According to one embodiment of the present invention, the contact plate 9 as shown in FIG. 3 is formed with slots or grooves 13 which are shaped so that the contact plate 9 can be deformed to contact the plate 5 just as easily in the central region as in the edge region. The direction of the the grooves 13 is dependent on the shape of the horn operating means 2 and consequently on the shape of the contact plate 9.

The contact plate 5 according to the embodiment shown in FIG. 4 differs from the conventional in that its projections 6, 7, 14 and 15 are higher in the central region than in the edge region. This results in the opposite contact plate 9 in FIG. 2 having to be less deformed for contacting in the central region than in the edge region.

The resilient foam sheet 8 shown in FIG. 5 shows again the openings 11, 12 for the projections 6, 7 of the contact plate 5 which are in the form of round holes and which are of conventional size in so far as they are located in the edge region of this part. According to the third embodiment of the present invention, the apertures 16, 17 and 18 in the central region of this part are made larger than those 11 and 12 in the edge region to thereby reduce the resistance of the foam sheet 8 to pressing the contact plates 5, 9 against each other in the central region. To this end, it will be seen that the central most hole 18 is larger than holes 16 and 17 which are aligned therewith across the horizontal and widest span of the foam sheet horizontal and which are in turn larger than the various holes 11 and 12 in the edge portion.

The foregoing description of the preferred embodiments of the invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in varius embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A horn operating mechanism for a steering wheel of a motor vehicle, comprising two contact plates which are separated from each other solely by a resilient perforated foam sheet at least substantially co-extensive therewith, one contact plate being provided with projections directed towards the other contact plate, apertures in the foam sheet exposing the projections to said other contact plate and said other contact plate being elastically deformable by human hand manipulated pressure applied to said other contact plate at points opposite said projections to effect contact of said projections respectively with said other contact plate, characterized by force reducing means located in a central region of and formed integral with one of said contact plates and foam sheet parts for reducing the pressure that would otherwise be required to act on said other plate in a central region thereof to effect contact with said projections in said central region, said force reducing means comprising apertures in the central region of said foam sheet that are larger than those apertures in an edge region of said foam sheet.

2. A horn operating mechanism for a steering wheel of a motor vehicle, comprising two contact plates which are separated from each other solely by a resilient perforated foam sheet at least substantially co-extensive therewith, one contact plate being provided with projections directed towards the other contact plate, apertures in the foam sheet exposing the projections to said other contact plate and said other contact plate being elastically deformable by human hand manipulated pressure applied to said other contact plate at points opposite said projections to effect contact of said projections respectively with said other contact plate, characterized by force reducing means located in a central region of and formed integral with one of said contact plates and foam sheet parts for reducing the pressure that would otherwise be required to act on said other plate in a central region thereof to effect contact with said projections in said central region, said force reducing means comprising projections in the central region of the one contact plate that are a shorter distance away from the other contact plate than those projections in an edge region of said one contact plate.

* * * * *